US011190591B2

(12) United States Patent
Shivarajapura et al.

(10) Patent No.: US 11,190,591 B2
(45) Date of Patent: Nov. 30, 2021

(54) METHODS, SYSTEMS, AND COMPUTER READABLE MEDIA FOR RESOURCE OPTIMIZATION IN GROUP MESSAGE DELIVERY FOR NARROWBAND INTERNET OF THINGS (NB-IOT) DEVICES

(71) Applicant: Oracle International Corporation, Redwood Shores, CA (US)

(72) Inventors: Anup Shivarajapura, Bangalore (IN); Venkatesh Aravamudhan, Bangalore (IN); Nitin Gupta, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 151 days.

(21) Appl. No.: 16/516,238

(22) Filed: Jul. 18, 2019

(65) Prior Publication Data

US 2021/0021672 A1 Jan. 21, 2021

(51) Int. Cl.
*H04L 29/08* (2006.01)
*H04L 5/00* (2006.01)
(Continued)

(52) U.S. Cl.
CPC ............ *H04L 67/12* (2013.01); *H04L 5/0037* (2013.01); *H04W 4/14* (2013.01); *H04W 68/005* (2013.01)

(58) Field of Classification Search
CPC ........ H04L 67/12; H04L 5/0037; H04W 4/14; H04W 68/005
See application file for complete search history.

(56) References Cited

U.S. PATENT DOCUMENTS 9,948,646 B1 * 4/2018 Lai ....................... H04L 63/0884
10,582,349 B1 * 3/2020 Huang .................... H04W 4/18
(Continued)

OTHER PUBLICATIONS

Commonly-Assigned, co-pending U.S. Appl. No. 16/656,535 for "Methods, Systems, and Computer Readable Media for Non-Internet Protocol (Non-IP) Data Delivery Between User Equipment (UEs) and Multiple Application Servers (ASs)," (Unpublished, filed Oct. 17, 2019).

(Continued)

*Primary Examiner* — Kent Krueger
(74) *Attorney, Agent, or Firm* — Jenkins, Wilson, Taylor & Hunt, P.A.

(57) ABSTRACT

According to one aspect, the subject matter described herein includes a method for service-specific group message delivery to narrowband Internet of things (IoT) devices. The method includes operations performed by a network node including at least one processor. The operations include receiving, on a first interface, a request for service-specific group message delivery to narrowband IoT devices supporting a specified service. The operations further include generating, by the network node, a message for service-specific group message delivery for transmission on a second interface, the message including a NB-IoT service information parameter for identifying a narrowband IoT service provided by the narrowband IoT devices supporting the specified service. The operations further include transmitting, from the network node and on the second interface the message for service-specific group message delivery to narrowband IoT devices.

20 Claims, 6 Drawing Sheets

(51) Int. Cl.
*H04W 68/00* (2009.01)
*H04W 4/14* (2009.01)

(56) References Cited

U.S. PATENT DOCUMENTS

| | | | |
|---|---|---|---|
| 2014/0221027 A1* | 8/2014 | Laumen | H04W 4/14 455/466 |
| 2016/0007170 A1 | 1/2016 | Vaidya et al. | |
| 2017/0251342 A1 | 8/2017 | Bhalla | |
| 2017/0339534 A1 | 11/2017 | Bhalla | |
| 2018/0054799 A1 | 2/2018 | Starsinic et al. | |
| 2018/0077714 A1 | 3/2018 | Kodaypak et al. | |
| 2018/0092133 A1 | 3/2018 | Starsinic et al. | |
| 2018/0160288 A1* | 6/2018 | Chastain | H04W 8/12 |
| 2018/0160292 A1* | 6/2018 | Chastain | H04W 60/00 |
| 2018/0192234 A1 | 7/2018 | Mohamed et al. | |
| 2018/0220256 A1 | 8/2018 | Kotecha et al. | |
| 2018/0310141 A1 | 10/2018 | Yin et al. | |
| 2018/0324671 A1* | 11/2018 | Palnati | H04W 12/069 |
| 2019/0075552 A1* | 3/2019 | Yu | H04W 72/04 |
| 2019/0090122 A1* | 3/2019 | Palnati | H04W 4/70 |
| 2020/0120475 A1* | 4/2020 | Gupta | H04W 8/06 |
| 2020/0146077 A1 | 5/2020 | Li et al. | |
| 2020/0267008 A1* | 8/2020 | Chen | H04L 12/1407 |
| 2020/0296665 A1 | 9/2020 | Huang et al. | |
| 2020/0344576 A1* | 10/2020 | Li | H04W 4/06 |
| 2020/0404482 A1 | 12/2020 | Xu | |
| 2021/0058766 A1 | 2/2021 | Aravamudhan et al. | |
| 2021/0120377 A1 | 4/2021 | Mahalank et al. | |
| 2021/0120389 A1 | 4/2021 | Baek et al. | |

OTHER PUBLICATIONS

"3rd Generation Partnership Project; Technical Specification Group Core Network and Terminals; T8 reference point for Northbound APIs (Release 16)," 3GPP TS 29.122 V16.3.0, pp. 1-322 (Sep. 2019).

"3rd Generation Partnership Project; Technical Specification Group Services and System Aspects; Architecture enhancements to facilitate communications with packet data networks and applications (Release 16)," 3GPP TS 23.682 V16.4.0, pp. 1-133 (Sep. 2019).

"3rd Generation Partnership Project; Technical Specification Group Core Network and Terminals; Home Subscriber Server (HSS) diameter interfaces for interworking with packet data networks and applications (Release 15)," 3GPP TS 29.336 V15.7.0, pp. 1-75 (Sep. 2019).

"3rd Generation Partnership Project; Technical Specification Group Core Network and Terminals; Mobility Management Entity (MME) and Serving GPRS Support Node (SGSN) interfaces for interworking with packet data networks and applications (Release 16)," 3GPP TS 29.128 V16.0.0, pp. 1-51 (Sep. 2019).

"3rd Generation Partnership Project; Technical Specification Group Services and System Aspects; General Packet Radio Service (GPRS) enhancements for Evolved Universal Terrestrial Radio Access Network (E-UTRAN) access (Release 16)," 3GPP TS 23.401 V16.4.0, pp. 1-424 (Sep. 2019).

Commonly-Assigned, co-pending U.S. Appl. No. 16/546,227 for "Methods, Systems, and Computer Readable Media for Group Device Triggering for Internet of Things (IoT) Devices," (Unpublished, filed Aug. 20, 2019).

"3rd Generation Partnership Project; Technical Specification Group Core Network and Terminals; T8 reference point for Northbound APIs (Release 16)," 3GPP TS 29.122 V16.2.0, pp. 1-309 (Jun. 2019).

"3rd Generation Partnership Project; Technical Specification Group Core Network and Terminals; Mobile Application Part (MAP) specification (Release 15)," 3GPP TS 29.002 V15.5.0, pp. 1-1024 (Jun. 2019).

"3rd Generation Partnership Project; Technical Specification Group Core Network and Terminals; Home Subscriber Server (HSS) diameter interfaces for interworking with packet data networks and applications (Release 15)," 3GPP TS 29.336 V15.6.0, pp. 1-75 (Mar. 2019).

"3rd Generation Partnership Project; Technical Specification Group Core Network and Terminals; Tsp interface protocol between the MTC Interworking Function (MTC-IWF) and Service Capability Server (SCS) (Release 15)," 3GPP TS 29.368 V15.0.0, pp. 1-33 (Jun. 2018).

"3rd Generation Partership Project; Techincal Specification Group Radio Access Network; Evolved Universal Terrestrial Radio Access Network (E-UTRAN); S1 Application Protocol (S1AP) (Release 15)," 3GPP TS 36.413, V15.6.0, pp. 1-388 (Jul. 2019).

"3rd Generation Partnership Project; Technical Specification Group Services and System Aspects; Architecture enhancements to facilitate communications with packet data networks and applications (Release 16)," 3GPP TS 23.682, V16.3.0, pp. 1-132 (Jun. 2016).

"3rd Generation Partnership Project; Technical Specification Group Radio Access Network; Evolved Universal Terrestrial Radio Access (E-UTRA); Radio Resource Control (RRC); Protocol specification (Release 15)," 3GPP TS 36.331, V15.6.0, pp. 1-960 (Jun. 2019).

"3rd Generation Partnership Project; Technical Specification Group Core Network and Terminals; Mobility Management Entity (MME) and Serving GPRS Support Node (SGSN) interfaces for interworking with packet data networks and applications (Release 15)," 3GPP TS 29.128, V15.5.0, pp. 1-52 (Mar. 2019).

"3rd Generation Partnership Project; Technical Specification Group Core Network and Terminals; Diameter-based T4 interface for communications with packet data networks and applications (Release 15)," 3GPP TS 29.337, V15.0.0, pp. 1-24 (Jun. 2018).

Commonly-Assigned, co-pending U.S. Appl. No. 17/110,255 for "Methods, Systems, and Computer Readable Media for Providing a Unified Interface Configured to Support Infrequent Data Communications via a Network Exposure Function," (Unpublished, filed Dec. 2, 2020).

"3rd Generation Partnership Project; Technical Specification Group Core Network and Terminals; 5G System; Network Exposure Function Northbound APIs; Stage 3 (Release 16)," 3GPP TS 29.522, V16.5.0, pp. 1-161 (Sep. 2020).

"3rd Generation Partnership Project; Technical Specification Group Services and System Aspects; System architecture for the 5G System (5GS); Stage 2 (Release 16)," 3GPP TS 23.501, V16.6.0, pp. 1-447 (Sep. 2020).

"3rd Generation Partnership Project; Technical Specification Group Services and System Aspects; Procedures for the 5G System (5GS); Stage 2 (Release 16)," 3GPP TS 23.502, V16.6.0, pp. 1-597 (Sep. 2020).

"3rd Generation Partnership Project; Technical Specification Group Core Network and Terminals; T8 reference point for Northbound APIs; (Release 16)," 3GPP TS 29.122, V16.7.0, pp. 1-361 (Sep. 2020).

"3rd Generation Partnership Project; Technical Specification Group Services and System Aspects; Architecture enhancements to facilitate communications with packet data networks and applications (Release 16)," 3GPP TS 23.682, V16.8.0, pp. 1-135 (Sep. 2020).

Non-Final Office Action for U.S. Appl. No. 16/546,227 (dated Feb. 8, 2021).

Non-Final Office Action for U.S. Appl. No. 16/546,227 (dated Jun. 14, 2021).

Notice of Allowance and Fee(s) Due for U.S. Appl. No. 16/656,535 (dated May 19, 2021).

Notice of Allowance and Fee(s) Due for U.S. Appl. No. 16/516,238 (dated Aug. 3, 2021).

* cited by examiner

METHODS, SYSTEMS, AND COMPUTER READABLE MEDIA FOR RESOURCE OPTIMIZATION IN GROUP MESSAGE DELIVERY FOR NARROWBAND INTERNET OF THINGS (NB-IOT) DEVICES

TECHNICAL FIELD

The subject matter described herein relates to routing messages to IoT devices. More particularly, the subject matter described herein relates to methods, systems, and computer readable media for resource optimization in group message delivery to narrowband IoT devices.

BACKGROUND

Narrowband IoT is a low power wide area network (LP WAN) radio technology standard developed by the 3$^{rd}$ Generation Partnership Project (3GPP). Narrowband IoT enables an IoT device to have extended battery life, as the frequency of data transmission is on the order of hours or days, depending on the service supported by the device. The device can remain in a sleep mode between transmissions to conserve battery life.

The node in the narrowband IoT network that instructs narrowband IoT devices to wake up and deliver messages is called the IoT application server or AS. The IoT application server or AS in the network may support multiple services. To initiate communications with narrowband IoT devices in a network, the IoT AS may initiate group message delivery with all of the narrowband IoT devices in the network. The group message delivery is effected by sending a paging request to all of the devices, regardless of whether the devices support the service that is of interest to the AS. The result of the paging message is to wake up all of the IoT devices in the network, including those that do not support the service in which the AS is interested. Waking up devices that do not support a given service results in unnecessary power consumption and reduced battery life. In addition, signaling bandwidth in the network can be unnecessarily consumed when devices that do not support a given service respond to a group message.

3GPP specifications do not support a mechanism to only page a UE that supports a specific service. 3GPP specifications also do not define a mechanism for an IoT device to avoid establishing a radio connection in response to paging for a group message delivery procedure. Accordingly, in light of these difficulties, there exists a need for improved methods, systems, and computer readable media for resource optimization in group message delivery to narrowband IoT devices.

SUMMARY

The subject matter described herein introduces service awareness in paging for IoT devices during the scenario of group message delivery to avoid the devices being awakened when they do not support a given service. Supporting service awareness requires modification of many nodes and interfaces in the network over what is currently specified by 3GPP standards. For example, the T8 interface is the interface used by the service capability server/application server (SCS/AS) to register new IoT devices and to request information from registered IoT devices. On this interface, the group message delivery procedure between the SCS/AS and the network exposure function/service capability exposure function (NEF/SCEF) is modified to include service information for which the group message delivery procedure is applicable. For example, the message from the SCS/AS to initiate the group message delivery procedure may specify service 1, service 2, or service n when requesting group message delivery.

Another modification that may be made is that the home subscriber server/user data management node (HSS/UDM) may be modified to validate service information for a narrowband IoT device. For example, when an IoT device is onboarded onto the network, the HSS/UDM may authorize the device and the service identifier that identifies the service provided by the device.

Yet another interface that may be modified is the T6a interface between the NEF/SCEF and the access management function/mobility management entity (AMF/MME). The procedure used to initiate a paging request or transmission of other data to NB IoT devices on the T6a interface is referred to as the mobile terminated non-IP data delivery (MT-NIDD) procedure. According to the subject matter described herein, the MT-NIDD procedure will be modified to include service information identifying the service for which paging or other communication is requested. Thus, the NEF and/or SCEF may be modified or configured to include a service identifying parameter in the message transmitted to the AMF or MME on the T6a interface for group message delivery to narrowband IoT devices, the AMF or MME may be configured to decode the service identifying parameter and formulate a corresponding message for effecting group message delivery to IoT devices.

Yet another interface that is modified is the S1-AP interface between the AMF/MME and the g-nodeB/e-nodeB (gNB/eNB). On the S1-AP interface, the paging procedure towards the gNB/eNB is modified to include service information. For example, the AMF or MME may include the service identifying parameter in messages to the gNB or eNB for group message delivery to NB-IoT devices.

Yet another interface that requires modification to support service-specific paging is the interface between the gNB/eNB and the IoT devices. The paging message sent from the gNB/eNB towards the IoT devices will include service identifying parameters. It is important to note that the paging message may be received by NB-IoT devices that support the service identified by the service identifying parameter and by NB-IoT devices that do not support the service identified by the service identifying parameter.

The IoT devices may also be modified to support identification of a service in an MT-NIDD message. The IoT devices may be modified such that compliant devices only respond to MT-NIDD messages that identify a service that is supported by the receiving NB-IoT devices. NB-IoT devices that support the service identified in the MT-NIDD message may respond to the requesting eNB-gNB according to the service. For example, if the NB-IoT devices are sensors, the devices may respond to the message with sensor data. If the NB-IoT devices do not support the identified service, the NB-IoT devices may refrain from waking up and responding to the message from the eNB or gNB.

According to one aspect, the subject matter described herein includes a method for service-specific group message delivery to narrowband Internet of things (IoT) devices. The method includes operations performed by a network node including at least one processor. The operations include receiving, on a first interface, a request for service-specific group message delivery to narrowband IoT devices supporting a specified service. The operations further include generating, by the network node, a message for service-specific group message delivery for transmission on a second interface, the message including a NB-IoT service information parameter for identifying a narrowband IoT service provided by the narrowband IoT devices supporting the specified service. The operations further include transmitting, from the network node and on the second interface the message for service-specific group message delivery to narrowband IoT devices.

According to another aspect of the subject matter described herein, the network node comprises a service capability exposure function (SCEF), the first interface comprises a T8 interface, and the second interface comprises an S6a interface.

According to yet another aspect of the subject matter described herein, the network node comprises a network exposure function (NEF), the first interface comprises a T8 interface, and the second interface comprises an Nudm interface.

According to yet another aspect of the subject matter described herein, the network node comprises a short message service center (SMS-SC).

According to yet another aspect of the subject matter described herein, the network node comprises a mobility management entity (MME), the first interface comprises an S6a interface, and the second interface comprises an S1AP interface.

According to yet another aspect of the subject matter described herein, the network node comprises an access management function (AMF), the first interface comprises an Nudm interface, and the second interface comprises an N2 interface.

According to yet another aspect of the subject matter described herein, the network node comprises an evolved node B (eNB), the first interface comprises an S1AP interface, and the second interface comprises a radio resource control (RRC) interface.

According to yet another aspect of the subject matter described herein, the network node comprises a g-node B (gNB), the first interface comprises an N2 interface, and the second interface comprises a radio resource control (RRC) interface.

According to yet another aspect of the subject matter described herein, the message comprises a paging message.

According to yet another aspect of the subject matter described herein, the method further includes receiving, by a narrowband IoT device, the message for service-specific narrowband IoT group message delivery. The method further includes determining, by the narrowband IoT device, whether the service identified by the NB-IoT service information parameter corresponds to a service provided by the narrowband IoT device. The method further includes, in response to determining that the service identified by the NB IoT device service identifier corresponds to a service provided by the narrowband IoT device, initiating wake-up of the narrowband IoT device. The method further includes, in response to determining that the service identified by the NB IoT device service identifier is not a service provided by the narrowband IoT device, ignoring the message and refraining from initiating wake up of the narrowband IoT device.

According to yet another aspect of the subject matter described herein, a system for service-specific group message delivery to narrowband Internet of things (IoT) devices is provided. The system includes a network node including at least one processor. The network node further includes a first interface for receiving a request for service-specific group message delivery to narrowband IoT devices supporting a specified service. The network node further includes a service-specific group message narrowband IoT message generator implemented by the at least one processor for generating a message for service-specific group message delivery to narrowband IoT devices, the message including a NB-IoT service information parameter for identifying a narrowband IoT service provided by the narrowband IoT devices supporting the specified service. The network node further includes a second interface for transmitting the message for service-specific group message delivery to narrowband IoT devices.

According to yet another aspect of the subject matter described herein, the network node comprises a service capability exposure function (SCEF), the first interface comprises a T8 interface, and the second interface comprises an S6a interface.

According to yet another aspect of the subject matter described herein, the network node comprises a network exposure function (NEF), the first interface comprises a T8 interface, and the second interface comprises an Nudm interface.

According to yet another aspect of the subject matter described herein, the network node comprises a short message service center (SMS-SC).

According to yet another aspect of the subject matter described herein, the network node comprises a mobility management entity (MME), the first interface comprises an S6a interface, and the second interface comprises an S1AP interface.

According to yet another aspect of the subject matter described herein, the network node comprises an access management function (AMF), the first interface comprises an Nudm interface and the second interface comprises an N2 interface.

According to yet another aspect of the subject matter described herein, the network node comprises an evolved node B, the first interface comprises an S1AP interface, and the second interface comprises a radio resource control (RRC) interface.

According to yet another aspect of the subject matter described herein, the network node comprises a g-node B (gNB), the first interface comprises an N2 interface, and the second interface comprises a radio resource control (RRC) interface.

According to yet another aspect of the subject matter described herein, the system includes a narrowband IoT device for receiving, the message for service-specific narrowband IoT group message delivery, determining, whether the service identified by the NB IoT device service identifier corresponds to a service provided by the narrowband IoT device, in response to determining that the service identified by the NB IoT device service identifier corresponds to a service provided by the narrowband IoT device, initiating wake-up of the narrowband IoT device, and, in response to determining that the service identified by the NB IoT device service identifier is not a service provided by the narrowband IoT device, ignoring the message and refraining from initiating wake up of the narrowband IoT device.

According to yet another aspect of the subject matter described herein a non-transitory computer readable medium having stored thereon executable instructions that when executed by the processor of a computer control the computer to perform steps is provided. The steps are performed at a network node including at least one processor. The steps include receiving, on a first interface, a request for service-specific group message delivery to narrowband IoT devices supporting a specified service. The steps further include generating, by the network node, a message for service-specific group message delivery for transmission on a second interface, the message including a NB-IoT service information parameter for identifying a narrowband IoT service provided by the narrowband IoT devices supporting the specified service. The steps further include transmitting, from the network node and on the second interface the message for service-specific group message delivery to narrowband IoT devices.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
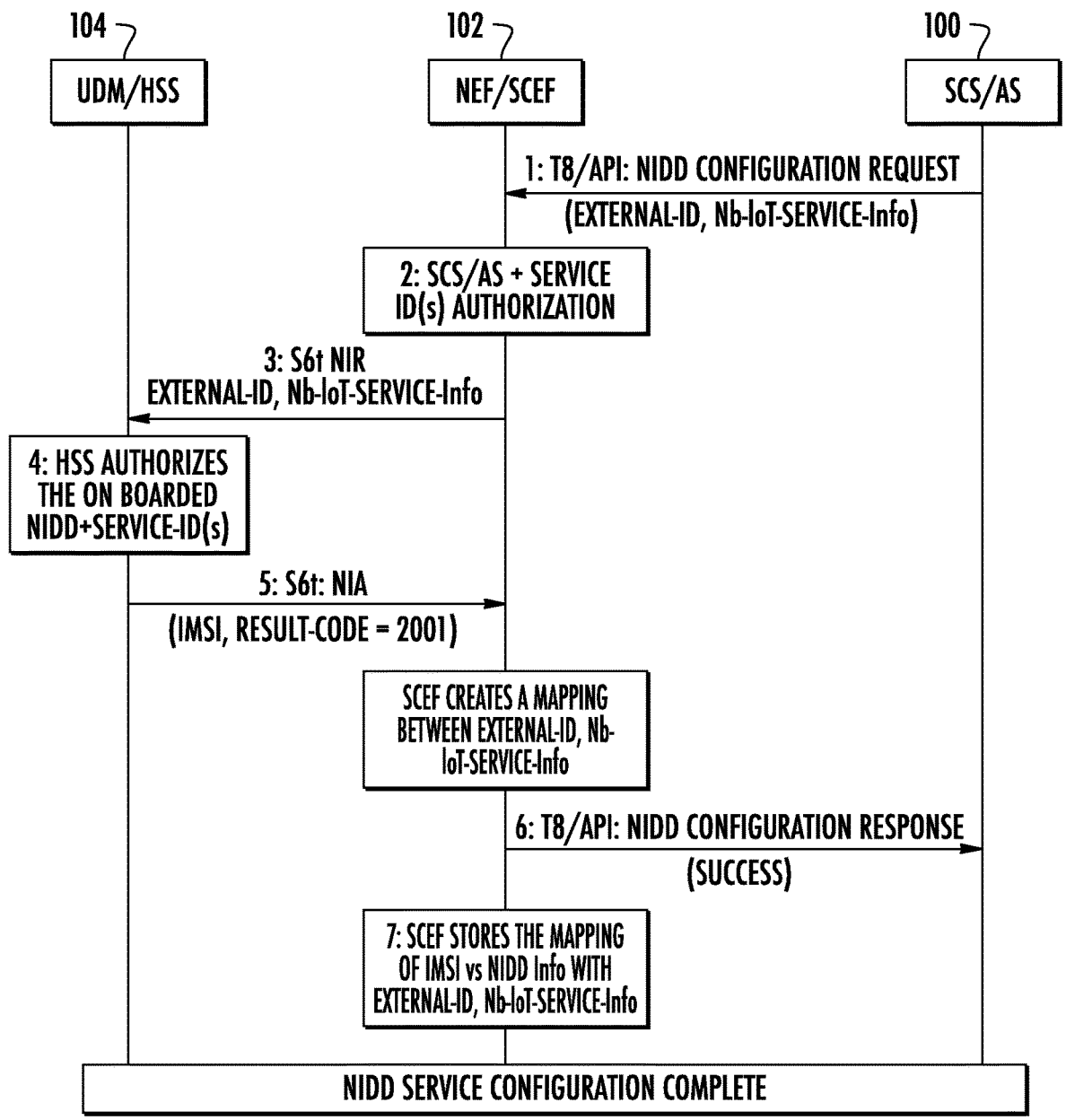
FIG. 1 is a message flow diagram illustrating exemplary messages for service-specific IoT device onboarding.

Prior to initiating group message delivery to narrowband IoT devices, the IoT devices may be onboarded or registered with the network along with services supported by the narrowband IoT devices. FIG. 1 is a message flow diagram illustrating IoT device onboarding with supported services.

Referring to FIG. 1, in line 1, SCS/AS 100 sends an NIDD configuration request message on the T8 interface to NEF/SCEF 102. The NIDD configuration request includes the external ID of the IoT device and a new parameter, NB-IoT-service-info, identifying the service supported by the device. In line 2, NEF/SCEF 102 receives the onboarding request including the external ID and the service identifier. In line 3, NEF/SCEF 102 sends a non-IP data delivery information request (NIR) message on the S6t interface to UDM/HSS 104. The NIR message includes the external ID of the IoT device and the service identifier.

In line 4 of the message flow diagram, UDM/HSS 104 authorizes the onboarded IoT device and service identifiers. In line 5, UDM/HSS 104 sends a non-IP data delivery information answer message to NEF/SCEF 102 indicating that the IoT device and the requested service have been validated. In response to receiving notification of the successful validation, NEF/SCEF 102 creates a mapping between the external ID and the service identifier.

In line 6 of the message flow diagram, NEF/SCEF 102 sends an NIDD configuration response message on the T8 interface to SCS/AS 100 indicating successful configuration of the NB-IoT device. In line 7 of the message flow diagram, NEF/SCEF 102 stores a mapping between MC received in the NIA message and the NIDD information, including the service identifier. After line 7, the NIDD service configuration is complete.

Figure 2:
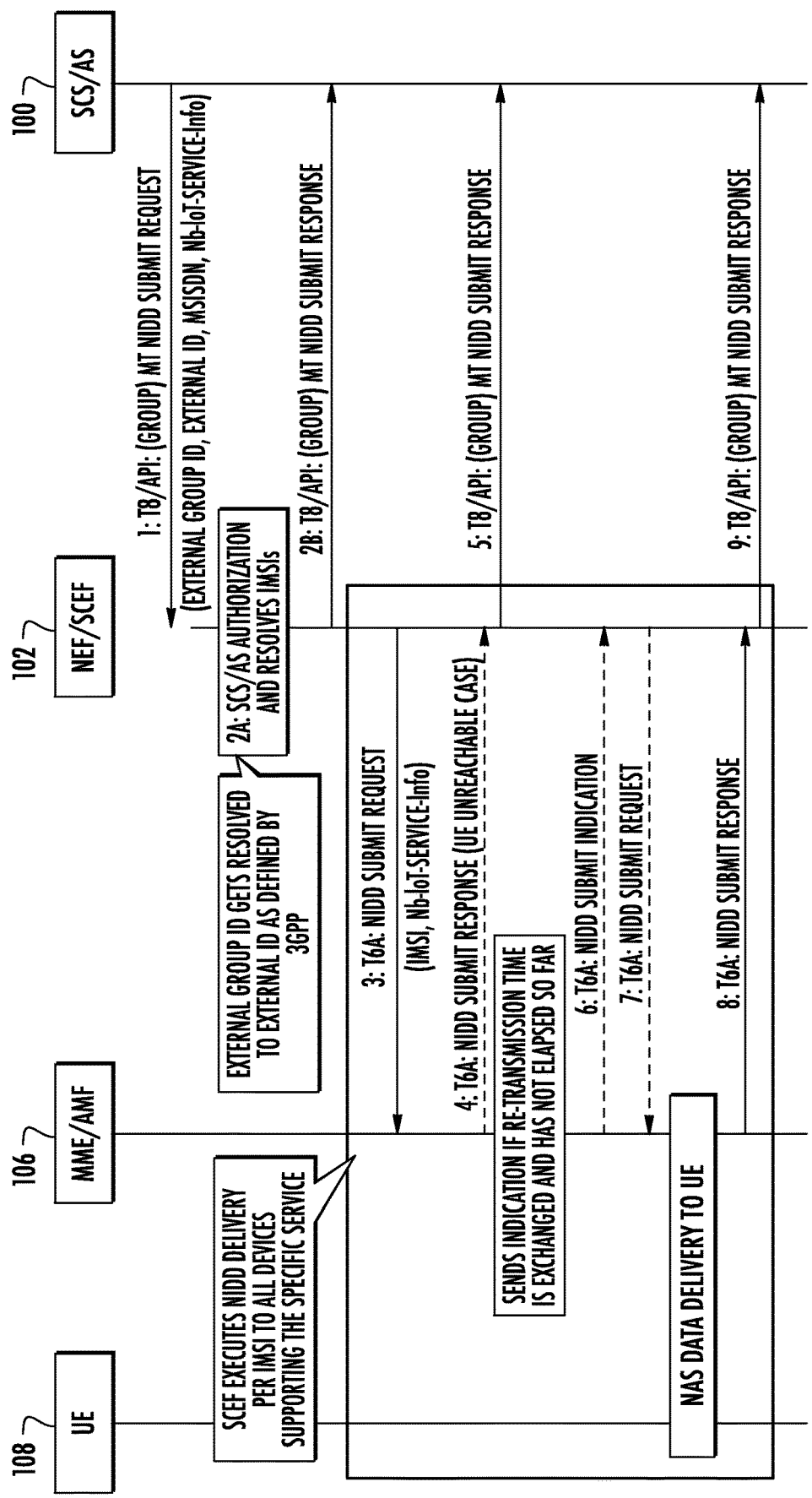
FIG. 2 is a message flow diagram illustrating service-specific group message delivery for narrowband IoT devices.

Once an NB-IoT device has been registered with the network, and each of the nodes have been modified to support service identification as part of a group message delivery procedure, an SCS/AS can initiate a service-specific group message delivery to NB-IoT devices in the network, and only those devices that are configured to support the specified service will respond to the group message delivery procedure. FIG. 2 is a message flow diagram illustrating service-specific group message delivery. Referring to FIG. 2, in line 1 of the message flow diagram, SCS/AS 100 initiates a service-specific group message delivery procedure by sending an MT NIDD submit request message to NEF/SCEF 102 on the T8 interface. The MT NIDD submit request message includes an external group ID that identifies NB-IoT devices, an external ID, a mobile subscriber integrated services digital network (MSISDN) number, and the NB-IoT-service-info parameter, which identifies the specific service.

In line 2, NEF/SCEF 102 receives the MT NIDD submit request message, authorizes the SCS/AS, and resolves the international mobile subscriber identifiers (IMSISs). The external group ID is resolved to external IDs of individual UEs. In step 2B, NEF/SCEF 102 sends an MT NIDD submit response message to SCS/AS 100. The submit response message indicates that the submit request was successfully received and authorized.

In line 3 of the message flow diagram, NEF/SCEF 102 sends an NIDD submit request message on the T6a interface to MME/AMF 106. The NIDD submit request includes the IMSI and the NB-IoT-service-info parameter, which identifies the requested service. The purpose of the NIDD submit request is for NEF/SCEF 102 to execute NIDD delivery per IMSI to all IoT devices that support a specific service. If the IoT devices are unreachable, MME/AMF 106 in step 4 responds with an NIDD submit response message to NEF/SCEF 102 indicating that the IoT devices are unreachable. In line 5, NEF/SCEF 102 sends an MT NIDD submit response to SCS/AS 100 indicating UE unreachability.

In line 6. MME/AMF 106 sends an NIDD submit indication message to NEF/SCEF 102 indicating that a retransmission time has not elapsed. In line 7 of the message flow diagram, NEF/SCEF 102 sends an NIDD submit request message on the T6a interface to MME/AMF 106 to initiate retransmission of the NIDD data to UE 108, which may be a narrowband IoT device. In this example, it is assumed that UE 108 is available. Accordingly, MME/AMF 106 initiates NAS data delivery to the UE. The NAS data delivery may include the service identifier so that only UEs that are configured to provide the requested service respond. In line 8 of the message flow diagram, MME/AMF 106 sends an NIDD submit response message on the T6a interface to NEF/SCEF 102. The NIDD submit response message confirms successful service-specific data delivery to the UE. In line 9 of the message flow diagram, NEF/SCEF 102 sends an MT NIDD submit response message to SCS/AS 100. The MT NIDD submit response message confirms successful completion of the service-specific group message delivery procedure.

Figure 3:
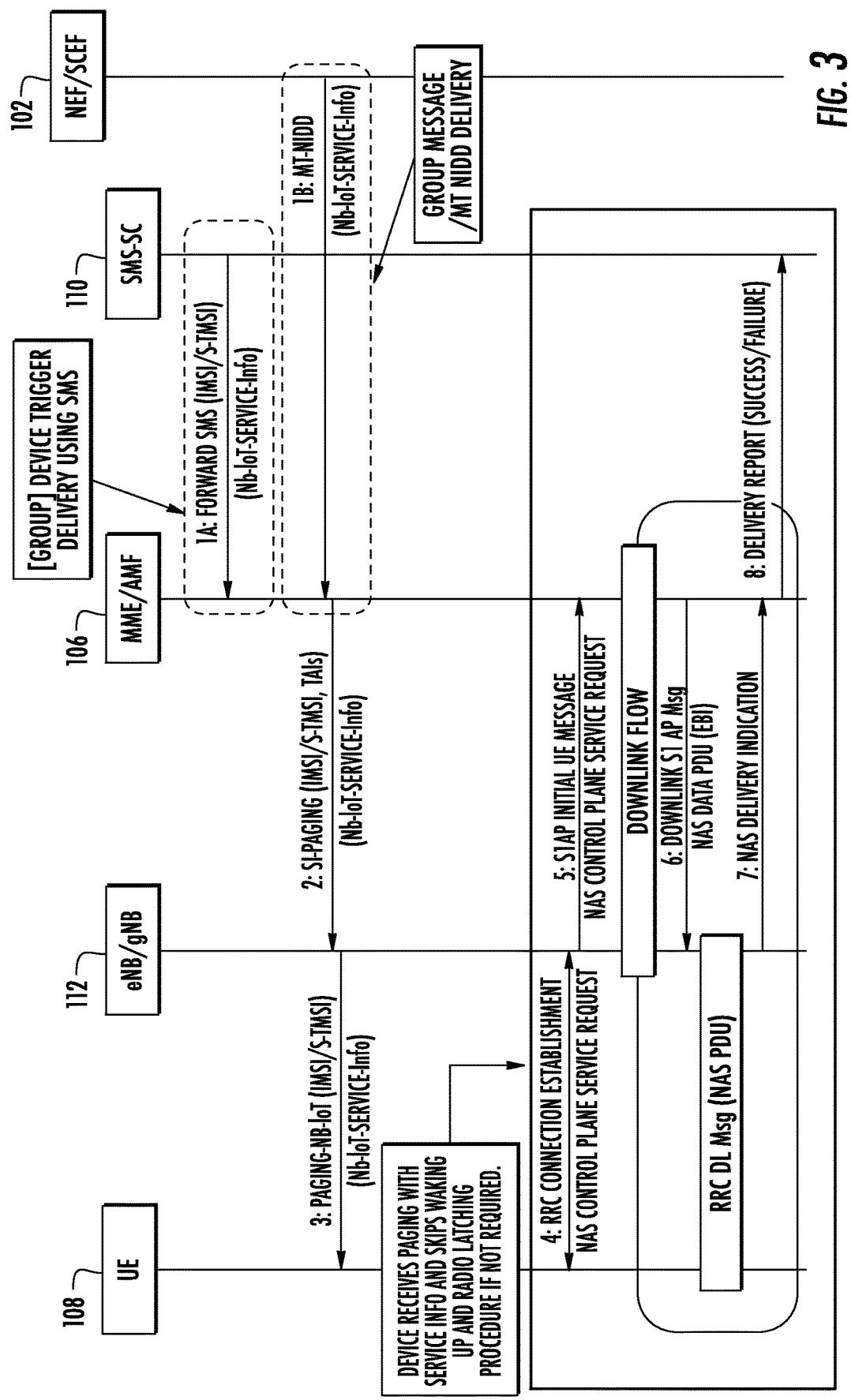
FIG. 3 is a message flow diagram illustrating service-specific non-access stratum (NAS) data delivery to a narrowband IoT device in idle mode.

FIG. 3 is a message flow diagram illustrating exemplary messages exchanged for NAS data delivery to the UE in response to the service-specific group message delivery procedure illustrated in FIG. 2. In FIG. 3, two alternate service-specific group message delivery procedures are illustrated. One service-specific group delivery procedure is initiated by NEF/SCEF 102. An alternate service-specific group message delivery procedure is initiated by short message service center (SMS-SC) 110.

Referring to the message flow in FIG. 3, in step 1A, SMS-SC 110 sends a forward short message (FSM) message to MME/AMF 106 to initiate a service-specific group message delivery procedure to UEs capable of providing the specific service. The FSM message includes the NB-IoT-service-info parameter, the IMSI, and the serving temporary mobile subscriber identifier (S-TMSI).

In the alternate delivery scenario, the service-specific group message NIDD delivery is initiated by NEF/SCEF 102. As illustrated in step 1B, the alternate method is initiated by NEF/SCEF 102 sending an MT-NIDD message including NB-IoT-service-info parameter to MME/AMF 106 on the T6a interface. The MT-NIDD message may be generated by NEF/SCEF 102 in response to NEF/SCEF 102 receiving a message from SCS/AS 100 on the T8 interface requesting service-specific group message delivery to narrowband IoT devices.

Once MME/AMF 106 receives the message from either SMS-SC 110 or NEF/SCEF 102, MME/AMF 106 in line 2 sends an S1 paging request message to eNB/gNB 112. The S1-paging info message includes the IMSI, the S-TMSI, the tracking area identifiers (TAIs), and the NB-IoT-service-info parameter.

In response to receiving the S1-paging request message including the NB-IoT-service-info parameter, eNB/gNB 112 in line 3 sends a paging-NB-IoT message to UEs within the service area of eNB/gNB 112. The paging-NB-IoT message includes the IMSI or S-TMSI and the NB-IoT-service-info parameter.

UEs that receive the paging information including the NB-IoT-service-info parameter will wake up and perform the radio latching procedure if the UE supports the specified service. If the UE does not support the specified service, the device will not perform the wake up and radio latching procedures.

In line 4 of the message flow diagram, it is assumed that UE 108 receives the paging request message and is configured to provide the identified service. Accordingly, UE 108 performs radio resource control (RRC) connection establishment procedures with eNB/gNB 112. In line 5 of the message flow diagram, eNB/gNB 112 sends an initial UE message that in the illustrated example is a NAS control plane service request to MME/AMF 106.

In line 6, MME/AMF 106 initiates transmission of downlink data to the identified UE. The downlink data is transmitted in a downlink S1 AP message that carries a NAS data protocol data unit (PDU). In response to receiving the NAS data PDU, eNB/gNB 112 sends an RRC downlink data message including the NAS PDU to UE 108. Once the UE confirms successful delivery, in line 7, eNB/gNB sends an indication of successful data delivery to MME/AMF 106. In line 8, MME/AMF 106 sends a delivery support message to either SMS-SC 110 or NEF/SCEF 102 indicating success or failure of the delivery process. Thus, using the steps in FIG. 3, service-specific paging of UEs, such as NB-IoT devices is performed.

As stated above, one interface that requires modification to support service-specific group message delivery to NB-IoT devices is the T8 interface between the SCS/AS and the NEF/SCEF. In particular, the submit NIDD request procedure must include parameters that identify the service type. Table 1 shown below illustrates the parameters that are included in an NIDD request message.

TABLE 1

NIDD Request Message Parameters

| Attribute Name | Data Type | Cardinality |
| --- | --- | --- |
| externalId | ExternalId | 0 . . . 0 |
| externalGroupId | ExternalGroupId | 0 . . . 1 |
| msisdn | Msisdn | 0 . . . 1 |
| self | Link | 0 . . . 1 |
| data | Binary | 1 |
| reliableDataService | Boolean | 0 . . . 1 |
| rdsPort | RdsPort | 0 . . . 1 |
| maximumLatency | DurationSec | 0 . . . 1 |
| priority | Integer | 0 . . . 1 |
| pdnEstablishmentOption | PdnEstablishmentOptions | 0 . . . 1 |
| deliverystatus | DeliveryStatus | 0 . . . 1 |
| requestedRetransmissionTime | DateTime | 0 . . . 1 |
| Nb-IoT-service-info | String | 0 . . . n |

In Table 1, it can be seen that the NIDD request message includes the NB-IoT-service-info parameter which identifies the type of service provided by the NB-IoT devices to which the message is directed.

Yet another interface that requires modification to support service-specific group message delivery is the T6a interface between NEF/SCEF 102 and MME/AMF 106. The message sent on this interface to provide service-specific group message delivery is referred to as a diameter MT-data-request message. The following are exemplary parameters that may be included in a Diameter-MT-data request message sent on the T6a interface for service-specific group message delivery.

<MT-Data-Request>=<DiameterHeader:8388734,REQ,
  PXY,16777346>
  <Session-Id>
  <User-Identifier>
  <Bearer-Identifier>
  [DRMP]
  {Auth-Session-State}
  {Origin-Host}
  {Origin-Realm}
  [Destination-Realm]
  [OC-Supported-Features]
  *[Supported-Features]
  [Nb-Iot-Service-Info]
  [Non-IP-Data]
  [SCEF-Wait-Time]
  [Maximum-Retransmission-Time]
  *[Proxy-Info]
  *[Route-Record]
  *[AVP]

In the list of parameters above, the MT-data request message includes the NB-IoT-service-info parameter which identifies the service provided by the NB-IoT devices to which the message is directed.

On the S1 AP interface between MME/AMF 106 and eNB/gNB 112, the paging message must also be modified to include the NB-IoT-service-info parameter. Table 2 shown below illustrates exemplary parameters that may be included in a paging message sent from MME/AMF 106 to eNB/gNB 112.

TABLE 2

Paging Message Parameters for Service-specific Group Message Delivery to Narrowband IoT Devices

| IE/Group Name | Presence | Range | IE Type and Reference | Criticality | Assigned Criticality |
|---|---|---|---|---|---|
| Message Type | M | | 9.2.1.1 | Yes | Ignore |
| UE Identity Index Value | M | | 9.2.3.10 | Yes | Ignore |
| UE Paging Identity | M | | 9.2.3.13 | Yes | Ignore |
| Paging DRX | O | | 9.2.2.16 | Yes | Ignore |
| CN Domain | M | | 9.2.3.22 | Yes | Ignore |
| List of TAIs | | 1 | | Yes | Ignore |
| >TAI List Item | | 1 . . . <max#ofTAIs> | | EACH | Ignore |
| >>TAI | M | | 9.2.3.16 | — | |
| . . . | | | | | |
| NB-IoT Paging eDRX Information | O | | 9.2.1.115 | Yes | Ignore |
| NB-IoT UE Identity Index Value | O | | 9.2.3.47 | Yes | Ignore |
| Enhanced Coverage Restricted | O | | 9.2.2.123 | Yes | Ignore |
| CE-Mode-B Restricted | O | | 9.2.1.129 | Yes | Ignore |
| Nb-IoT-service-info | O | 1 . . . <maxNoOf . . .> | String | | |

In Table 2, it can be seen that the paging message is modified to include the NB-IoT-service-info parameter as an optional parameter. The NB-IoT-service-info parameter identifies the type of service provided by the UEs to which the paging message is directed.

On the RRC interface between eNB/gNB 112 and UE 108, the narrowband paging message is also modified to include the NB-IoT-service-info parameter. The message sent on the RRC interface is referred to as the paging-NB message. The paging-NB message is used to notify one or more UEs of a transmission. The paging-NB message is sent on the PCCH channel from the network to the UE. The following are parameters that may be included in the paging-NB message.

Figure 4:
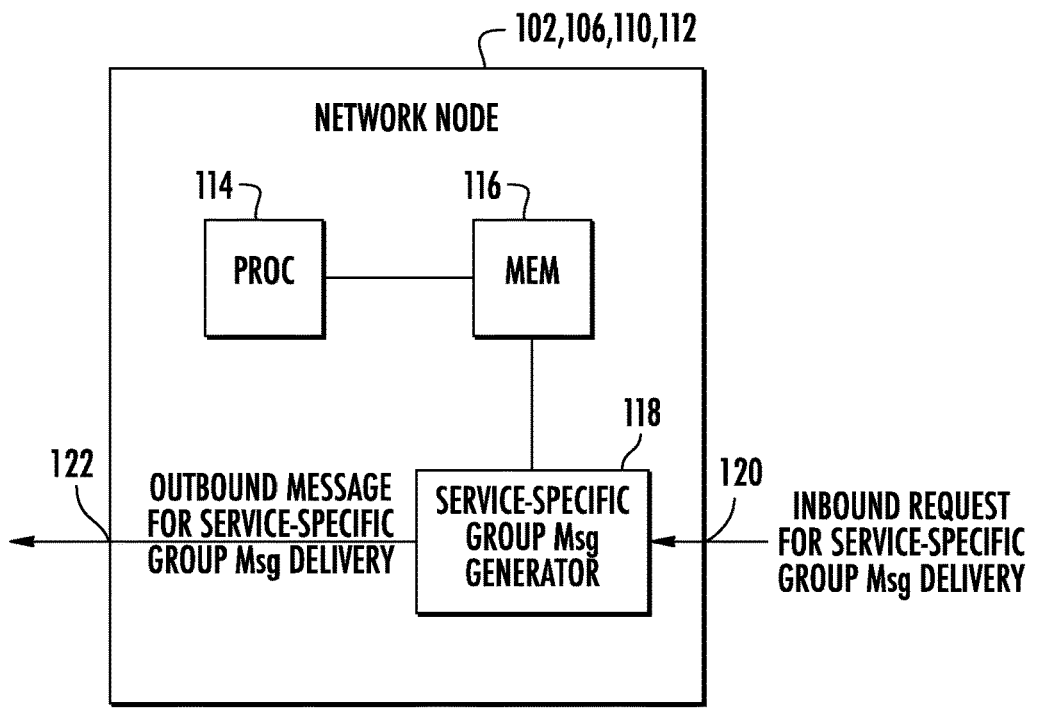
FIG. 4 is a block diagram illustrating an exemplary network node for service-specific group message delivery to narrowband IoT devices.

FIG. 4 is a block diagram of a network node that is capable of performing service-specific group message delivery to NB-IoT devices. The network node illustrated in FIG. 4 may be any of NEF/SCEF 102, SMS-SC 110, MME/AMF 106, or eNB/gNB 112. Referring to FIG. 4, network node 102, 106, 110, or 112 includes at least one processor 114 and a memory 116. Network node 102, 106, 110, or 112 also includes a service-specific group message delivery module 118 that receives that inbound request for service-specific group message delivery on a first interface 120 and formulates and transmits an outbound message for service-specific group message delivery on a second interface 122. For example, if the network node is NEF/SCEF 102, interface 120 may be the T8 interface, and interface 122 may be the T6a interface, such that the network the node receives an inbound request on the T8 interface and formulates an outbound message for group message delivery to NB-IoT devices on the T6a interface. In another example, if the network node is MME/AMF 106 interface 120 may be the T6a interface or the interface with SMS-SC 110, and the

```
--ASN1START
Paging-NB ::=    SEQUENCE                              {
PagingRecordList-r13    PagingRecordList-NB-r13OPTIONAL,--need on
systemInfoModification-r13 ENUMERATED {true}          OPTIONAL,--need on
systemInfoModification-eDX-r13ENUMERATED {true}       OPTIONAL, --need on
nonCriticalExtension                    SEQUENCE { )  OPTIONAL
}
PagingRecordList-NB-r13 ::=             SEQUENCE (size(1...maxPageRec) ) of
PagingRecord-NB-r13
PagingRecord-NB-r13 ::=  SEQUENCE{
Ue-Identity-r13                         PagingUE-Identity,
Nb-IoT-service-info
...
}
--ASN1STOP
``` outbound interface may be the S1-AP interface. If the network node is SMS-SC 110, interface 120 may be the interface with over which SMS-SC 110 communicates with SCS/AS 100, and interface 122 may be the interface between SMS-SC 110 and MME/AMF 106. If the network node is eNB/gNB 112, interface 120 may be the S1-AP interface, and interface 122 may be the RRC interface.

Figure 5:
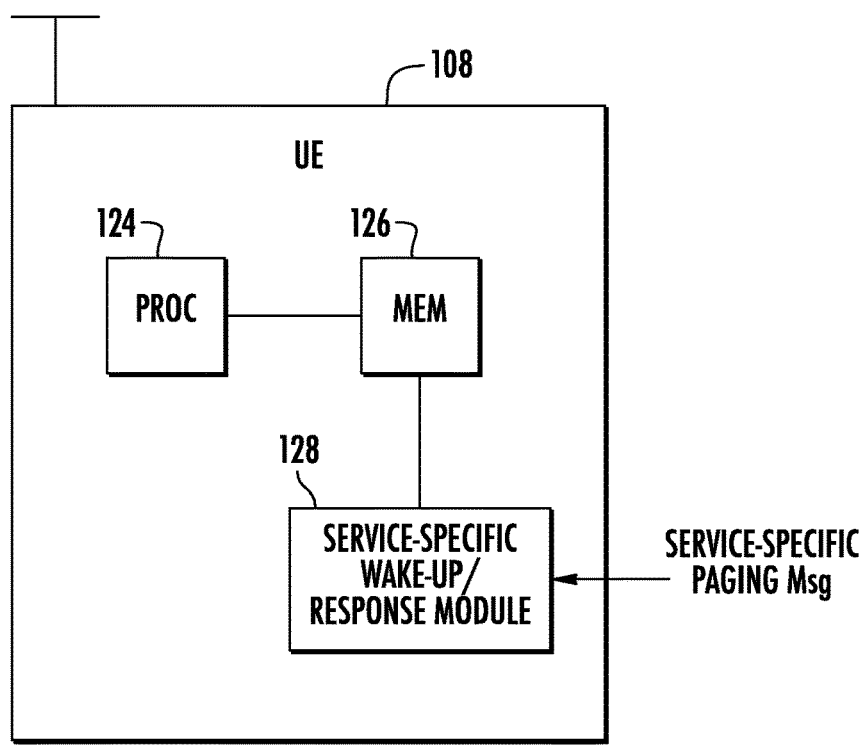
FIG. 5 is a block diagram illustrating an exemplary NB-IoT device supporting service-specific group message delivery.

FIG. 5 is a block diagram of UE 108 illustrating modifications for responding to service-specific paging request messages. Referring to FIG. 5, UE 108 includes a processor 124 and a memory 126. UE 108 further includes a service-specific wake up/response module 128. Service-specific wake up/response module 128 receives service-specific paging messages on the RRC interface from eNB/gNB 112. Service-specific wake up/response module 128 decodes the service-specific paging message to determine whether the service identified in the paging message corresponds to a service for which UE 108 is configured to support. If service-specific wake up/response module 128 determines that the message is directed a service for which UE 108 is configured to support, service-specific wake up/response module 128 may initiate a wake up procedure to wake up UE 108 and cause UE 108 to respond to the service-specific paging message. If service-specific wake up/response module 128 determines that the service-specific paging message does not specify a service for which UE 108 is configured, service-specific wake up/response module 128 may ignore the message and refrain from initiating the wake up procedure of UE 108.

Figure 6:
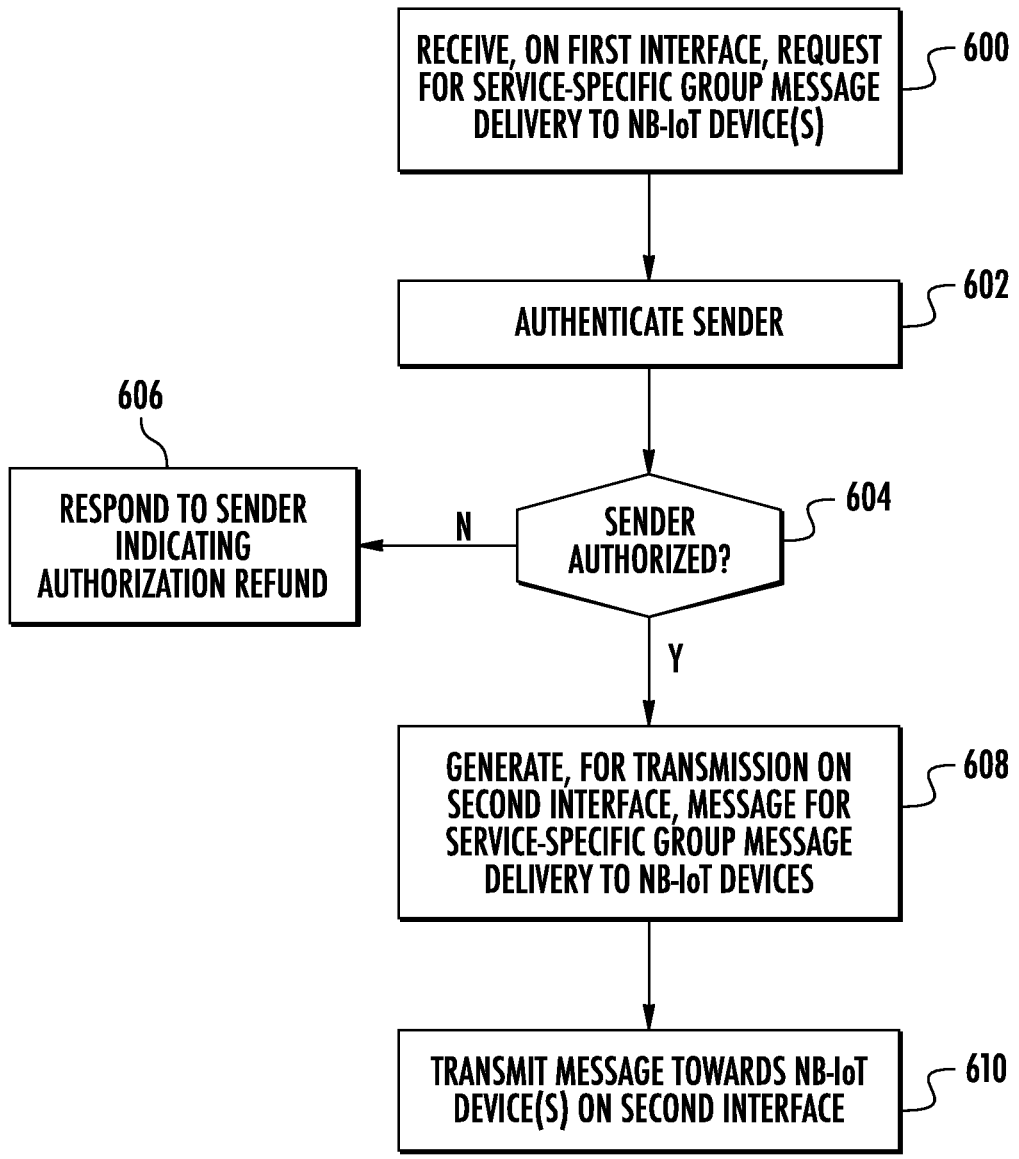
FIG. 6 is a flow chart illustrating an exemplary process performed by a network node in supporting service-specific group message delivery to NB-IoT device.

FIG. 6 is a flow chart illustrating an exemplary process implemented by a network node, such as network node 102, 106, 110, or 112 illustrated in FIG. 4, for service-specific group message delivery to NB-IoT devices. Referring to FIG. 6, in step 600, the network node receives on a first interface, a request for service-specific group message delivery to one or more NB-IoT devices. For example, network node 102, 106, 110, or 112 may receive an inbound request for service-specific group message delivery. The message may arrive on the T8 interface if the network node is an SCEF or NEF, on the T6a interface if the network node is an MME or AMF, on the S1-AP interface if the network node is an eNB/gNB, or an SMS related interface if the network node is an SMS-SC.

In step 602, the sender is authenticated. The authentication step may be performed if the network node is an NEF, SCEF, or SMS-C, where the originator, such as an SCS/AS, is authenticated. In step 604, if the sender is not authorized to send the message, control proceeds to step 606 where a response is transmitted to the sender indicating that authorization to send the message has been refused.

In step 604, if it is determined that the sender is authorized to send the message, control proceeds to step 608 where a service-specific group message delivery message is generated for transmission on a second interface to or towards NB-IoT devices. If the network node is an SCEF or NEF, the second interface may be the T6a interface, and the message may be an NIDD submit request message. If the network node is an MME or AMF, the second interface may be an S1-AP interface, and the message transmitted on the second interface may be an S1 paging message. If the network node is an eNB or gNB, the second interface may be an RRC interface, and the message may be a paging-NB-IoT message.

In step 610, the message is transmitted towards the NB-IoT devices on the second interface. For example, the outbound message may be transmitted on the T6a, S1-AP or RRC interface depending on whether the network node is an SCEF or NEF 102, an MME or AMF 106, an SMS-SC 110, or an eNB/gNB 112.

Figure 7:
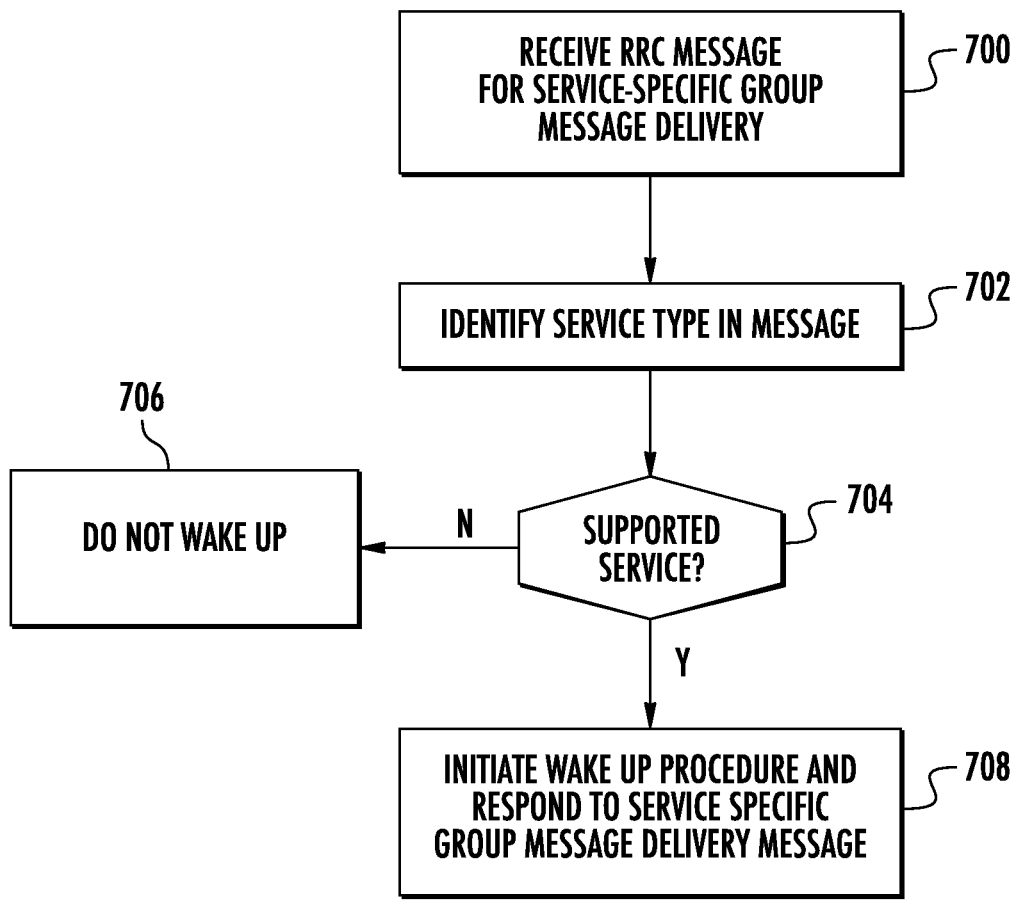
FIG. 7 is a flow chart illustrating an exemplary process performed by an NB-IoT device in supporting service-specific group message delivery.

FIG. 7 is a flow chart illustrating an exemplary process that may be performed by a UE in supporting service-specific group message delivery. Referring to FIG. 7, in step 700, the UE receives an RRC message for service-specific group message delivery. For example, the RRC message may be a paging request that includes the NB-IoT-service-info parameter.

In step 702, the UE identifies the service type in the message. Identifying the service type may include implementing limited low power device functionality sufficient to decode the NB-IoT-service-info parameter.

In step 704, the UE determines whether the service type is a supported service type. Determining whether the service type identified in the message is a supported service type may include comparing the service type in the message to store parameters that indicate the type of service that the IoT device provides. If the service type is not a supported service type, control proceeds to step 706 where the UE does not wake up or respond to the message. Thus, by recognizing that the service type is not a service that the IoT device provides, the IoT device can conserve battery life and reduce signaling in the network. If the identified service type is supported, control proceeds to step 708 where the UE initiates the wake up procedure and responds to the service-specific group message delivery message. The group message delivery message may be a message instructing all UEs in a service area that support a give service type to wake up and provide sensor data to an IoT application server or service capability server. The IoT devices that support the identified service respond to the request, and the IoT device that do not support the identified service refrain from waking up or responding to the group message delivery message.

Thus, by providing for service-specific group message delivery to NB-IoT devices, network resources are optimized by reducing the signaling load on the network. Devices that are not configured to provide the service identified in the group message delivery messages do not establish the radio channel with the eNB or gNB. As a result, signaling on the radio or wireless part of the network as well as the wired part of the network is reduced. In addition, NB-IoT device battery utilization is improved as devices avoid unnecessary wake up operations and do away with unnecessary establishment of radio channels.

The disclosure of each of the following references is incorporated herein by reference in its entirety.

REFERENCES 1. 3GPP TS 23.682; 3rd Generation Partnership Project; Technical Specification Group Radio Access Network; Evolved Universal Terrestrial Radio Access (E-UTRAN); Architecture enhancements to facilitate communications with packet data networks and applications, (Release 16) V16.3.0 (2019-06).
2. 3GPP TS 29.128; Mobility Management Entity (MME) and Serving GPRS Support Node (SGSN) interfaces for interworking with packet data networks and applications (Release 15) V15.5.0 (2019-03).
3. 3GPP TS 36.331 3rd Generation Partnership Project; Technical Specification Group Radio Access Network; Evolved Universal Terrestrial Radio Access (E-UTRAN); Radio Resource Control (RRC); Protocol specification (Release 15) V15.6.0 (2019-06).

4. 3GPP TS 36.413; 3rd Generation Partnership Project; Technical Specification Group Radio Access Network; Evolved Universal Terrestrial Radio Access Network (E-UTRAN); S1 Application Protocol (S1AP) (Release 15) V15.6.0 (2019-07).
5. 3GPP TS 29.337; 3rd Generation Partnership Project; Technical Specification Group Core Network and Terminals; Diameter-based T4 interface for communications with packet data networks and applications (Release 15) V15.0.0 (2018-06).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for service-specific group message delivery to narrowband (NB) Internet of things (IoT) devices, the method comprising:
    at a network node including at least one processor:
    receiving, on a first interface, a request for service-specific group message delivery to the narrowband IoT devices supporting a specified service;
    generating, by the network node, a message for service-specific group message delivery for transmission on a second interface, the message including a NB-IoT service information parameter for identifying a narrowband IoT service provided by the narrowband IoT devices supporting the specified service; and
    transmitting, from the network node and on the second interface the message for service-specific group message delivery to the narrowband IoT devices, wherein the message transmitted on the second interface includes the NB-IoT service information parameter and the NB-IoT service information parameter is usable in non-access-stratum (NAS) messaging to the narrowband IoT devices such that a narrowband IoT device of the narrowband IoT devices that receives a NAS message with the NB-IoT service information parameter and that does not provide the specified service will not respond to the NAS message and a narrowband IoT device of the narrowband IoT devices that receives a NAS message including the NB-IoT service information parameter and that provides the specified service will wake up and respond to the NAS message.

2. The method of claim 1 wherein the network node comprises a service capability exposure function (SCEF), wherein the first interface comprises a T8 interface, and wherein the second interface comprises an S6a interface.

3. The method of claim 1 wherein the network node comprises a network exposure function (NEF), wherein the first interface comprises a T8 interface, and wherein the second interface comprises an Nudm interface.

4. The method of claim 1 wherein the network node comprises a short message service center (SMS-SC).

5. The method of claim 1 wherein the network node comprises a mobility management entity (MME), the first interface comprises an S6a interface and the second interface comprises an S1AP interface.

6. The method of claim 1 wherein the network node comprises an access management function (AMF), the first interface comprises an Nudm interface and the second interface comprises an N2 interface.

7. The method of claim 1 wherein the network node comprises an evolved node B (eNB), the first interface comprises an S1AP interface, and the second interface comprises a radio resource control (RRC) interface.

8. The method of claim 1 wherein the network node comprises a g-node B (gNB), the first interface comprises an N2 interface, and the second interface comprises a radio resource control (RRC) interface.

9. The method of claim 8 wherein the message comprises a paging message.

10. The method of claim 1 comprising:
    receiving, by a narrowband IoT device, the message for service-specific narrowband IoT group message delivery;
    determining, by the narrowband IoT device, whether the service identified by the NB-IoT device service information parameter corresponds to a service provided by the narrowband IoT device;
    in response to determining that the service identified by the NB-IoT device service information parameter corresponds to a service provided by the narrowband Io device, initiating wake-up of the narrowband IoT device; and
    in response to determining that the service identified by the NB-IoT device service information parameter is not a service provided by the narrowband IoT device, ignoring the message and refraining from initiating wake up of the narrowband IoT device.

11. A system for service-specific group message delivery to narrowband (NB) Internet of things (IoT) devices, the system comprising:
    a network node including at least one processor, the network node further including:
    a first interface for receiving a request for service-specific group message delivery to the narrowband IoT devices supporting a specified service;
    a service-specific group message narrowband IoT message generator implemented by the at least one processor for generating a message for service-specific group message delivery to the narrowband IoT devices, the message including a NB-IoT service information parameter for identifying a narrowband IoT service provided by the narrowband IoT devices supporting the specified service; and
    a second interface for transmitting the message for service-specific group message delivery to the narrowband IoT devices, wherein the message transmitted on the second interface includes the NB-IoT service information parameter and the NB-IoT service information parameter is usable in non-access-stratum (NAS) messaging to the narrowband IoT devices such that a narrowband IoT device of the narrowband IoT devices that receives a NAS message with the NB-IoT service information parameter and that does not provide the specified service will not respond to the NAS message and a narrowband IoT device of the narrowband IoT devices that receives a NAS message including the NB-IoT service information parameter and that provides the specified service will wake up and respond to the NAS message.

12. The system of claim 11 wherein the network node comprises a service capability exposure function (SCEF), wherein the first interface comprises a T8 interface, and wherein the second interface comprises an S6a interface.

13. The system of claim 11 wherein the network node comprises a network exposure function (NEF), wherein the first interface comprises a T8 interface, and wherein the second interface comprises an Nudm interface.

14. The system of claim 11 wherein the network node comprises a short message service center (SMS-SC).

15. The system of claim 11 wherein the network node comprises a mobility management entity (MME), the first interface comprises an S6a interface and the second interface comprises an S1AP interface.

16. The system of claim 11 wherein the network node comprises an access management function (AMF), the first interface comprises an Nudm interface and the second interface comprises an N2 interface.

17. The system of claim 11 wherein the network node comprises an evolved node B, the first interface comprises an S1AP interface, and the second interface comprises a radio resource control (RRC) interface.

18. The system of claim 11 wherein the network node comprises a g-node B (gNB), the first interface comprises an N2 interface, and the second interface comprises a radio resource control (RRC) interface.

19. The system of claim 11 comprising a narrowband IoT device for:
    receiving the message for service-specific narrowband Io message delivery;
    determining whether the service identified by the NB-IoT service information parameter corresponds to a service provided by the narrowband IoT device;
    in response to determining that the service identified by the NB-IoT service information parameter corresponds to a service provided by the narrowband IoT device, initiating wake-up of the narrowband IoT device; and
    in response to determining that the service identified by the NB-IoT service information parameter is not a service provided by the narrowband IoT device, ignoring the message and refraining from initiating wake up of the narrowband IoT device.

20. A non-transitory computer readable medium having stored thereon executable instructions that when executed by the processor of a computer control the computer to perform steps comprising:
    at a network node including at least one processor:
    receiving, on a first interface, a request for service-specific group message delivery to narrowband (NB) Internet of things (IoT) devices supporting a specified service;
    generating, by the network node, a message for service-specific group message delivery for transmission on a second interface, the message including a NB-IoT service information parameter for identifying a narrowband IoT service provided by the narrowband IoT devices supporting the specified service; and
    transmitting, from the network node and on the second interface the message for service-specific group message delivery to the narrowband IoT devices, wherein the message transmitted on the second interface includes the NB-IoT service information parameter and the NB-IoT service information parameter is usable in non-access-stratum (NAS) messaging to the narrowband IoT devices such that a narrowband IoT device of the narrowband IoT devices that receives a NAS message with the NB-IoT service information parameter and that does not provide the specified service will not respond to the NAS message and a narrowband IoT device of the narrowband IoT devices that receives a NAS message including the NB-IoT service information parameter and that provides the specified service will wake up and respond to the NAS message.

* * * * *

UNITED STATES PATENT AND TRADEMARK OFFICE
CERTIFICATE OF CORRECTION

PATENT NO. : 11,190,591 B2
APPLICATION NO. : 16/516238
DATED : November 30, 2021
INVENTOR(S) : Shivarajapura et al.

It is certified that error appears in the above-identified patent and that said Letters Patent is hereby corrected as shown below:

On the Title Page

On page 2, Column 2, item (56), under Other Publications, Line 13, delete "Partership" and insert -- Partnership --, therefor.

On page 2, Column 2, item (56), under Other Publications, Line 13, delete "Techincal" and insert -- Technical --, therefor.

In the Specification

In Column 1, Line 17, delete "Iow" and insert -- low --, therefor.

In Column 1, Line 18, delete "technoIogy" and insert -- technology --, therefor.

In Column 1, Line 18, delete "deveIoped" and insert -- developed --, therefor.

In Column 5, Line 20, delete "Iogic" and insert -- logic --, therefor.

In Column 5, Line 23, delete "Iocated" and insert -- located --, therefor.

In Column 5, Line 29, delete "fIow" and insert -- flow --, therefor.

In Column 5, Line 31, delete "fIow" and insert -- flow --, therefor.

In Column 5, Line 34, delete "fIow" and insert -- flow --, therefor.

In Column 5, Line 37, delete "bIock" and insert -- block --, therefor.

In Column 5, Line 40, delete "bIock" and insert -- block --, therefor.

Signed and Sealed this
Twenty-eighth Day of February, 2023

Katherine Kelly Vidal
*Director of the United States Patent and Trademark Office*

In Column 5, Line 43, delete "fIow" and insert -- flow --, therefor.

In Column 5, Line 46, delete "fIow" and insert -- flow --, therefor.

In Column 5, Line 54, delete "aIong" and insert -- along --, therefor.

In Column 5, Line 55, delete "fIow" and insert -- flow --, therefor.

In Column 6, Line 1, delete "fIow" and insert -- flow --, therefor.

In Column 6, Line 9, delete "fIow" and insert -- flow --, therefor.

In Column 6, Line 12, delete "fIow" and insert -- flow --, therefor.

In Column 6, Line 24, delete "fIow" and insert -- flow --, therefor.

In Column 6, Line 26, delete "fIow" and insert -- flow --, therefor.

In Column 6, Line 43, delete "fIow" and insert -- flow --, therefor.

In Column 6, Line 57, delete "fIow" and insert -- flow --, therefor.

In Column 6, Line 66, delete "fIow" and insert -- flow --, therefor.

In Column 7, Line 3, delete "fIow" and insert -- flow --, therefor.

In Column 7, Line 8, delete "fIow" and insert -- flow --, therefor.

In Column 7, Line 17, delete "fIow" and insert -- flow --, therefor.

In Column 7, Line 52, delete "fIow" and insert -- flow --, therefor.

In Column 7, Line 57, delete "fIow" and insert -- flow --, therefor.

In Column 8, Line 41, delete "folIowing" and insert -- following --, therefor.

In Column 8, Line 45, delete ">=<" and insert -- >::=< --, therefor.

In Column 9, Line 4, delete "beIow" and insert -- below --, therefor.

In Column 9, Line 49, delete "folIowing" and insert -- following --, therefor.

In Column 10, Line 1, delete "bIock" and insert -- block --, therefor.

In Column 11, Line 8, delete "bIock" and insert -- block --, therefor.

CERTIFICATE OF CORRECTION (continued)
U.S. Pat. No. 11,190,591 B2

In Column 11, Line 31, delete "fIow" and insert -- flow --, therefor.

In Column 12, Line 4, delete "fIow" and insert -- flow --, therefor.

In Column 12, Line 14, delete "Iow" and insert -- low --, therefor.

In Column 12, Line 39, delete "Ioad" and insert -- load --, therefor.

In Column 12, Line 48, delete "discIosure" and insert -- disclosure --, therefor.

In Column 12, Line 48, delete "folIowing" and insert -- following --, therefor.